(12) United States Patent
Mochizuki et al.

(10) Patent No.: US 12,163,025 B2
(45) Date of Patent: Dec. 10, 2024

(54) CURABLE POLYORGANOSILOXANE COMPOSITION AND POLYORGANOSILOXANE CURED PRODUCT

(71) Applicant: MOMENTIVE PERFORMANCE MATERIALS JAPAN LLC, Tokyo (JP)

(72) Inventors: Kikuo Mochizuki, Tokyo (JP); Masahiro Fujita, Tokyo (JP)

(73) Assignee: MOMENTIVE PERFORMANCE MATERIALS JAPAN LLC, Tokyo (JP)

(*) Notice: Subject to any disclaimer, the term of this patent is extended or adjusted under 35 U.S.C. 154(b) by 871 days.

(21) Appl. No.: 17/328,101

(22) Filed: May 24, 2021

(65) Prior Publication Data

US 2021/0277241 A1    Sep. 9, 2021

Related U.S. Application Data

(63) Continuation of application No. PCT/JP2019/046424, filed on Nov. 27, 2019.

(30) Foreign Application Priority Data

Nov. 28, 2018 (JP) ................. 2018-221917
Nov. 26, 2019 (JP) ................. 2019-213744

(51) Int. Cl.
    *C08L 83/04*    (2006.01)

(52) U.S. Cl.
    CPC ........ *C08L 83/04* (2013.01); *C08L 2205/025* (2013.01); *C08L 2205/035* (2013.01)

(58) Field of Classification Search
    CPC .................. H01L 23/296; H01L 33/56
    See application file for complete search history.

(56) References Cited

U.S. PATENT DOCUMENTS

| | | | |
|---|---|---|---|
| 4,845,164 A * | 7/1989 | Gutek | C08L 83/04 528/31 |
| 5,371,163 A * | 12/1994 | Wilson | C08L 83/04 525/478 |
| 6,780,919 B2 * | 8/2004 | Ikeno | C08L 83/04 524/588 |
| 8,411,140 B2 | 4/2013 | Adelson | |
| 10,894,883 B2 | 1/2021 | Morita et al. | |
| 2009/0315989 A1 | 12/2009 | Adelson | |
| 2011/0046242 A1 * | 2/2011 | Garaud | A61K 9/7015 514/772.3 |
| 2011/0077344 A1 | 3/2011 | Hasegawa et al. | |
| 2012/0164406 A1 * | 6/2012 | Defaux | D06M 10/001 428/196 |
| 2017/0283613 A1 | 10/2017 | Mochizuki | |
| 2017/0283614 A1 | 10/2017 | Mochizuki et al. | |
| 2019/0153227 A1 | 5/2019 | Morita et al. | |
| 2019/0225806 A1 | 7/2019 | Muramatsu et al. | |
| 2020/0087514 A1 * | 3/2020 | Fukui | C08G 77/12 |
| 2020/0347229 A1 | 11/2020 | Fujisawa et al. | |
| 2022/0403221 A1 * | 12/2022 | Kelley | C09J 195/00 |

FOREIGN PATENT DOCUMENTS

| | | |
|---|---|---|
| CN | 107001803 A | 8/2017 |
| CN | 107429062 A | 12/2017 |
| JP | H06-293862 A | 10/1994 |
| JP | 2005-336327 A | 12/2005 |
| JP | 2009-052038 A1 | 3/2009 |
| JP | 5013507 B | 8/2012 |
| JP | 5449336 B2 | 3/2014 |
| JP | 2016-169331 A1 | 9/2016 |
| JP | 6243567 B1 | 12/2017 |
| JP | 2018-048214 A1 | 3/2018 |
| JP | 2018-095796 A | 6/2018 |
| WO | WO-2018/043270 A1 | 3/2018 |

OTHER PUBLICATIONS

Machine translation of JP 2005-350582 (no date).*
Extended European Search Report corresponding to EP Application No. 19890453.4, dated Jul. 21, 2022 (7 pages).
Office Action issued in corresponding Chinese Patent Application No. 201980078756.9, dated Jul. 13, 2022 (9 pages).

* cited by examiner

*Primary Examiner* — Marc S Zimmer
(74) *Attorney, Agent, or Firm* — Foley & Lardner LLP

(57) ABSTRACT

There is provided a polyorganosiloxane composition capable of providing a cured product which has low hardness, high transparency, high tensile strength, and low surface tackiness. A curable polyorganosiloxane composition includes: (A) alkenyl group-containing polyorganosiloxane containing straight-chained polyorganosiloxane composed of (A1) both ends alkenyl group polyorganosiloxane having a predetermined viscosity and (A2) polyorganosiloxane having a predetermined viscosity and having 0.6 or more and less than 2 alkenyl groups on average, and (A3) resinous polyorganosiloxane; (B) polyorganohydrogensiloxane composed of (B1) both ends Si—H-containing straight-chained polyorganosiloxane, and (B2) polyorganosiloxane having 3 or more Si—H; and (C) a hydrosilylation reaction catalyst, in mounts that satisfy predetermined relationships.

7 Claims, No Drawings

CURABLE POLYORGANOSILOXANE COMPOSITION AND POLYORGANOSILOXANE CURED PRODUCT

CROSS-REFERENCE TO RELATED APPLICATIONS

This application is a continuation of prior International Application No. PCT/JP 2019/046424, filed Nov. 27, 2019 which is based upon and claims the benefit of priority from Japanese Patent Applications No. 2018-221917, filed Nov. 28, 2018 and No. 2019-213744, filed Nov. 26, 2019; the entire contents of all of which are incorporated herein by reference.

FIELD

The present invention relates to curable polyorganosiloxane composition and cured product and, more specifically, a polyorganosiloxane composition capable of providing a cured product which has low hardness, high strength, transparency, and low surface tackiness, and a cured product made by curing the composition.

BACKGROUND

Conventionally, polyorganosiloxane compositions curing into silicone rubber have been well known, and are widely used as a potting material, a coating material, a molding material for shaping, injection molding and so on, and a covering material in an electric and electronic field, and optical and optoelectronics, sensor, architecture fields, utilizing their superior properties such as weather resistance, heat resistance, electrical insulation, hardness, mechanical strength, elongation and so on. Among them, a polyorganosiloxane composition which cures by an addition reaction increases in usage in the fields because it quickly cures by appropriate heating or UV irradiation and releases no corrosive substance during curing.

In recent years, an optical tactile sensor which has no complicated wiring at a part in contact with an object, and has a simple structure easily downsized is suggested as a contact sensor for a robot hand. As a constituent material for a touch pad for gripping the object, use of silicone rubber high in elasticity and transparent is considered (for example, refer to JP-B No. 5449336 and JP-B No. 5013507).

Conventionally, an addition reaction-curable silicone composition containing alkenyl group-containing polyorganosiloxane having a resin structure and containing no filler has been suggested as a composition providing a highly transparent cured product and used for an optical use such as a lens (for example, refer to JP-A No. 2009-52038 and JP-A No. 2018-48214).

However, a cured product obtained from each of the compositions disclosed in JP-A No. 2009-52038 and JP-A No. 2018-48214 is hard, such as 60 or more in measurement by Type A Durometer, so that the grip portion of the optical tactile sensor, if made of the cured product, may damage the object when the object to be gripped is soft. Besides, a hard cured product when used for a contact sensor of a type of recognizing the strain of the grip portion has a problem of incapable of recognizing a slight strain of the silicone rubber when gripping it.

Further, it has also been conventionally suggested that a cured product having low hardness is obtained by making the content of alkenyl group-containing polyorganosiloxane having a resin structure zero or small (for example, refer to JP-B No. 6243567), but it is difficult to obtain a cured product having sufficient strength as the constituent material of the above grip portion.

SUMMARY

This embodiment has been made to solve the problems, and an object thereof is to provide a polyorganosiloxane composition capable of providing a cured product having low hardness, high transparency, and high strength such as tensile strength.

A curable polyorganosiloxane composition of this embodiment contains:
 (A) alkenyl group-containing polyorganosiloxane having 1 or more alkenyl groups bonded to silicon atoms in a molecule;
 (B) polyorganohydrogensiloxane having 2 or more hydrogen atoms bonded to silicon atoms in a molecule; and
 (C) an effective amount of a hydrosilylation reaction catalyst.

Further, a curable polyorganosiloxane composition of this embodiment includes:
 (A) alkenyl group-containing polyorganosiloxane containing straight-chained polyorganosiloxane composed of (A1) 61 mass % or more and 95 mass % or less of straight-chained polyorganosiloxane having a viscosity at 23° C. measured according to JIS K6249 of 1,000 to 1,000,000 mPa·s and having an alkenyl group bonded to each of silicon atoms at both ends of a molecular chain and (A2) 5 mass % or more and 39 mass % or less of straight-chained polyorganosiloxane having a viscosity at 23° C. measured according to JIS K6249 of 10 to 50,000 mPa·s and having 0.6 or more and less than 2 alkenyl groups bonded to silicon atoms on average in one molecule, and (A3) polyorganosiloxane having a tetrafunctional siloxane unit represented by a formula: $SiO_{4/2}$ and having a resin structure having 2 or more alkenyl groups bonded to silicon atoms on average in one molecule, a content ratio of the component (A3) to a total of the component (A1), the component (A2), and the component (A3) being 6 mass % or more and 25 mass % or less;
 (B) polyorganohydrogensiloxane composed of (B1) straight-chained polyorganosiloxane having a viscosity at 23° C. measured according to JIS K6249 of 0.1 to 200 mPa·s and having 2 hydrogen atoms bonded to silicon atoms at both ends of a molecular chain in one molecule, and (B2) polyorganosiloxane having 3 or more hydrogen atoms bonded to silicon atoms in one molecule, in an amount that a molar ratio of the hydrogen atoms in the component (B1) to a total of the hydrogen atoms and the hydrogen atoms in the component (B2) is more than 0.2 and 0.75 or less and a molar ratio of a total of the hydrogen atoms in the component (B1) and the hydrogen atoms in the component (B2) to a total of the alkenyl groups in the component (A) is 0.9 or more and 2.1 or less; and
 (C) an effective amount of a hydrosilylation reaction catalyst.

A polyorganosiloxane cured product of this embodiment is a cured product made by curing the above curable polyorganosiloxane composition of this embodiment, used for at least one selected from an optical sensor, an optical tactile sensor, a pressure sensor, an optical member, and an artificial skin.

Note that in the following explanation, an "alkenyl group bonded to a silicon atom" is sometimes referred to simply as an "alkenyl group". Besides, a "hydrogen atom bonded to a silicon atom" is sometimes referred to simply as a "hydrogen atom" or "Si—H".

According to the curable polyorganosiloxane composition of this embodiment, a cured product which has low hardness, high transparency, and high mechanical strength such as tensile strength can be obtained. Further, this cured product has no bleeding of a liquid substance and has low surface tackiness.

DETAILED DESCRIPTION

Hereinafter, embodiments of this embodiment will be explained.

[Curable Polyorganosiloxane Composition]

A curable polyorganosiloxane composition in one embodiment of this embodiment contains: (A) alkenyl group-containing polyorganosiloxane containing straight-chained polyorganosiloxane composed of (A1) 61 mass % or more and 95 mass % or less of straight-chained polyorganosiloxane having an alkenyl group at each of both ends of a molecular chain and (A2) 5 mass % or more and 39 mass % or less of straight-chained polyorganosiloxane having 0.6 or more and less than 2 alkenyl groups on average in one molecule, and (A3) polyorganosiloxane having a resin structure having 2 or more alkenyl groups on average in one molecule; (B) polyorganohydrogensiloxane composed of (B1) straight-chained polyorganosiloxane having 2 hydrogen atoms at both ends of a molecular chain in one molecule and (B2) polyorganosiloxane having 3 or more hydrogen atoms in one molecule; and (C) an effective amount of hydrosilylation reaction catalyst.

Hereinafter the components of the composition of the embodiment will be explained.

<(A) Alkenyl Group-Containing Polyorganosiloxane>

The component (A) used in this embodiment is a main agent (base polymer) of the curable polyorganosiloxane composition, and contains (A1) straight-chained polyorganosiloxane having alkenyl groups at both ends of a molecular chain (hereinafter referred to as both ends alkenyl group-containing polyorganosiloxane), (A2) straight-chained polyorganosiloxane having 0.6 or more and less than 2 alkenyl groups on average (hereinafter, referred to as less than 2 alkenyl group-containing organosiloxane); and (A3) alkenyl group-containing polyorganosiloxane having a resin structure.

In the component (A), the content ratio of the component (A1) in 100 mass % of a total of the component (A1) and the component (A2) is 61 mass % or more and 95 mass % or less, and the content ratio of the component (A2) is 5 mass % or more and 39 mass % or less. Besides, the content ratio of the component (A3) in 100 mass % of a total of the component (A1), the component (A2), and the component (A3) is 6 mass % or more and 25 mass % or less. Further, the viscosity at 23° C. of the component (A1) (hereinafter, referred to simply as viscosity) is 1,000 to 1,000,000 mPa·s, and the viscosity of the component (A2) is 10 to 50,000 mPa·s. Note that the viscosity in this description is a value measured according to JIS K6249 except the case particularly explained.

<(A1) Both Ends Alkenyl Group-Containing Polyorganosiloxane>

The component (A1) is straight-chained polyorganosiloxane having a viscosity at 23° C. of 1,000 to 1,000,000 mPa·s and having an alkenyl group at each of both ends of a molecular chain.

Note that "polyorganosiloxane is straight-chained" means that a total amount of a trifunctional siloxane unit represented by a formula: $R^1SiO_{3/2}$ ($R^1$ is an unsubstituted or substituted monovalent hydrocarbon group containing no aliphatic unsaturated bond, and hydrocarbon groups other than alkenyl group can be exemplified) and a tetrafunctional siloxane unit represented by a formula: $Si_{4/2}$ to a total amount of all siloxane units is 5% or less in mole fraction.

Examples of the alkenyl group bonded to the silicon atom in the component (A1) include unsubstituted alkyl groups having a number of carbon atoms of 2 to 6 such as a vinyl group, an allyl group, a butenyl group, a pentenyl group, and a hexenyl group. Among these, the vinyl group is preferred. As the (A1) component, the one having two alkenyl groups, the two alkenyl groups each being bonded to each of the silicon atoms at both ends of the straight-chained molecular chain is preferable. Note that the two alkenyl groups may be the same or different, but are preferably the same from a viewpoint of ease of synthesis.

Examples of an organic group other than the alkenyl group bonded to the silicon atom in the component (A1) include alkyl groups having a number of carbon atoms of 1 to 6 such as a methyl group, an ethyl group, a propyl group, a butyl group, a pentyl group, and a hexyl group. The methyl group is preferred because of the ease of synthesis.

A preferable concrete example of the component (A1) is both ends dimethylvinylsiloxy group-terminated polydimethylsiloxane.

The viscosity of the component (A1) is 1,000 to 1,000,000 mPa·s. When the viscosity falls within this range, a cured product to be obtained preferably has excellent mechanical properties. The viscosity of the component (A1) is preferably 3,500 to 200,000 mPa·s and particularly preferably 5,000 to 150,000 mPa·s.

<(A2) Less than 2 Alkenyl Group-Containing Polyorganosiloxane>

The component (A2) is straight-chained polyorganosiloxane having 0.6 or more and less than 2 alkenyl groups on average in one molecule (hereinafter, simply mentioned as "on average"), and plays a role in decreasing the crosslink density to decrease the hardness of a cured product.

The alkenyl group of the component (A2) may be bonded to any of the silicon atom at the middle of the molecular skeleton and the silicon atom at the end, and is preferably bonded to the silicon atom at the end of the molecule in terms of a reaction rate or formation of a rubber cured product having low hardness after reaction.

In order to obtain the polyorganosiloxane having 0.6 or more and less than 2 alkenyl groups on average being the component (A2), for example, polyorganosiloxane having alkenyl groups at both ends and straight-chained or branched polyorganosiloxane containing no alkenyl group are compounded so as to satisfy the aforementioned average number of alkenyl groups and to have a mean molecular weight realizing the aforementioned viscosity range, and subjected to cutting and equilibration of siloxane by a conventional method in the presence of an acid catalyst such as sulfuric acid, hydrochloric acid, or activated clay or an alkaline catalyst such as potassium hydroxide or tetramethylammonium hydroxide. In this case, cyclic polysiloxane, in particular, cyclic polysiloxane containing no vinyl group may be used in combination as a part of a raw material.

After the equilibration, the catalyst is removed by a conventional method and heating is performed under a reduced pressure to remove low-molecular polyorganosiloxane as a by-product or unreacted low-molecular polyorganosiloxane, thereby refining the polyorganosiloxane. The polyorganosiloxane obtained by the above method is obtained as a mixture of polyorganosiloxane having an alkenyl group at each of both ends, polyorganosiloxane having an alkenyl group at one end, and polyorganosiloxane having no alkenyl group. For example, in preparation of polyorganosiloxane having 1 alkenyl group on average, the polyorganosiloxane is obtained as a mixture of about 50 mol % of one end alkenyl group-containing polyorganosiloxane, about 25 mol % of both ends alkenyl group-containing polyorganosiloxane, and about 25 mol % of polyorganosiloxane having no alkenyl group.

Further, the component (A2) may be prepared by mixing polyorganosiloxane having less than 1 (for example, 0.5) alkenyl group in one molecule obtained by the above method and polyorganosiloxane having alkenyl groups at both ends. Furthermore, in order to obtain polyorganosiloxane having a number of alkenyl groups of 1 or more and less than 2 on average, the polyorganosiloxane having an alkenyl group at one end and the polyorganosiloxane having alkenyl groups at both ends may be simply mixed. In other words, a plurality of kinds of polyorganosiloxanes different in number of alkenyl groups contained can be mixed to have 0.6 or more and less than 2 alkenyl groups on average per molecule.

Further, the polyorganosiloxane having an alkenyl group at one end can also be compounded by a strong base living polymerization reaction. Note that the strong base living polymerization reaction is a reaction of ring-opening polymerizing cyclic polyorganosiloxane using an organic alkali metal compound as an initiator, and then capping the ends with chloroalkenylsilane.

Note that the component (A2) preferably has a reduced content of free oil or low-molecular siloxane which does not contribute to the curing reaction in order to reduce the tackiness of the cured product.

The viscosity of the component (A2) is 10 to 50,000 mPa·s. When the viscosity falls within this range, the obtained cured product preferably has excellent mechanical properties. The viscosity of the component (A2) is more preferably 10 to 10,000 mPa·s and particularly preferably 100 to 5,000 mPa·s.

As mentioned below, the content ratio of the component (A1) in 100 mass % of a total of the straight-chained alkenyl group-containing polyorganosiloxane composed of the component (A1) and the component (A2) is 61 mass % or more and 95 mass % or less, and the content ratio of the component (A2) is 5 mass % or more and 39 mass % or less. It is preferable that the content ratio of the component (A1) is 65 mass % or more and 95 mass % or less and the content ratio of the component (A2) is 5 mass % or more and 35 mass % or less. Expressing the content ratios explained above in mathematical expressions, the content ratio of the component (A1) can be expressed by $W_{A1}/(W_{A1}+W_{A2})$ and the content ratio of the component (A2) can be expressed by $W_{A2}/(W_{A1}+W_{A2})$ as follows. Here, $W_{A1}$ is the mass of the component (A1) and $W_{A2}$ is the mass of the component (A2).

$$0.61 \leq W_{A1}/(W_{A1}+W_{A2}) \leq 0.95$$

$$0.05 \leq W_{A2}/(W_{A1}+W_{A2}) \leq 0.39$$

In the case where the content ratio of the component (A2) is less than 5 mass % and the content ratio of the component (A1) is more than 95 mass %, the cured product having a desired low hardness (for example, a hardness by Type E Durometer of 50 or less) cannot be obtained. Besides, in the case where the content ratio of the component (A2) is more than 39 mass % and the content ratio of the component (A1) is less than 61 mass %, oil bleeding occurs in the cured product.

More preferable content ratios of the component (A1) and the component (A2) are 70 mass % or more and 90 mass % or less and 10 mass % or more and 30 mass % or less, respectively, in 100 mass % of a total of the component (A1) and the component (A2).

<(A3) Alkenyl Group-Containing Polyorganosiloxane Having a Resin Structure>

The component (A3) is polyorganosiloxane containing a tetrafunctional siloxane unit (hereinafter, mentioned as a Q unit) represented by a formula: $SiO_{4/2}$ and having a resin structure (three-dimensional network structure) having 2 or more alkenyl groups on average in one molecule. Hereinafter, "having a resin structure" is also mentioned as "resinous". A more preferable range of the number of alkenyl groups of the component (A3) is 2 or more on average in one molecule.

The resinous polyorganosiloxane being the component (A3) preferably contains a monofunctional siloxane unit represented by a formula: $R^2_3SiO_{1/2}$ and a bifunctional siloxane unit represented by a formula: $R^2_2SiO_{2/2}$ in addition to the Q unit. By using the above polyorganosiloxane, a cured product having high strength and low tackiness can be obtained.

In the above unit formula, $R^2$s each independently represent an alkenyl group or an unsubstituted alkyl group. At least one among a plurality of $R^2$s existing in one molecule of the resinous polyorganosiloxane is an alkenyl group. Examples of the alkenyl group include a vinyl group, an allyl group, a butenyl group, a pentenyl group, a hexenyl group, a heptenyl group and the like. The vinyl group is preferable. Examples of the unsubstituted alkyl group include a methyl group, an ethyl group, a propyl group, a butyl group, a pentyl group, a hexyl group, a heptyl group and the like. As the unsubstituted alkyl group, the methyl group is preferable.

Examples of the resinous polyorganosiloxane being the component (A3) include:

a copolymer having siloxane units composed of a monofunctional siloxane unit (hereinafter, also referred to as $R^3_3SiO_{1/2}$ unit) represented by a formula: $R^3_3SiO_{1/2}$ ($R^3$ is an unsubstituted alkyl group, and a plurality of $R^3$s may be different, this also applies to the following), a monofunctional siloxane unit (hereinafter, also referred to as $R^3_2R^4SiO_{1/2}$ unit) represented by a formula: $R^3_2R^4SiO_{1/2}$ ($R^3$ is an unsubstituted alkyl group, and $R^4$ is an alkenyl group, this also applies to the following), a bifunctional siloxane unit (hereinafter, also referred to as $R^3_2SiO_{2/2}$ unit) represented by a formula: $R^3_2SiO_{2/2}$, and a Q unit;

a copolymer composed of the $R^3_3SiO_{1/2}$ unit, the $R^3_2R^4SiO_{1/2}$ unit, and the Q unit; and a copolymer composed of the $R^3_2R^4SiO_{1/2}$ unit, the $R^3_2SiO_{2/2}$ unit, and the Q unit. One kind of these copolymers may be used independently, or two or more kinds of these copolymers may be used in combination.

Among the copolymers, the compound having the siloxane units composed of the $R^3_3SiO_{1/2}$ unit, the $R^3_2R^4SiO_{1/2}$ unit, and the Q unit is preferable.

More specifically, the copolymer having the siloxane units composed of a monofunctional siloxane unit (hereinafter, expressed by an $M^{vi}$ unit) represented by a formula: $(CH_3)_2(CH_2=CH)SiO_{1/2}$, a monofunctional siloxane unit (hereinafter, expressed as an M unit) represented by a formula: $(CH_3)_3SiO_{1/2}$, and the Q unit, is preferable. Further, as for the ratio of the $M^{vi}$ unit and the M unit and the Q unit, the total of the $M^{vi}$ unit and the M unit is preferably in a range of 0.5 to 2.0 moles to one mol of the Q unit.

The method of obtaining the resinous polyorganosiloxane being the component (A3) is not particularly limited and, for example, the resinous polyorganosiloxane can be obtained by a method of adding water to chlorosilane and alkoxysilane having alkenyl groups to perform hydrolysis.

A weight-average molecular weight Mw of the (A3) resinous polyorganosiloxane is preferably 500 to 8,000, and is more preferably in a range of 1,000 to 5,000. Note that Mw is a value when converted into polystyrene by gel permeation chromatography (hereinafter, referred to as GPC). When the Mw of the (B) resinous polyorganosiloxane is less than 500, the mechanical strength of the cured product cannot be stably obtained, whereas when it is more than 8,000, the viscosity of the composition unfavorably becomes high.

The resinous polyorganosiloxane being the component (A3) becomes a polymer component of the composition of this embodiment together with the aforementioned straight-chained component (A1) and component (A2).

As mentioned below, the content ratio of the component (A3) to the whole component (A) (the total of the component (A1), the component (A2), and the component (A3)) is set to 6 mass % or more and 25 mass % or less. Expressing the content ratio explained here by a mathematical expression, the content ratio of the component (A3) can be expressed by $W_{A3}/(W_{A1}+W_{A2}+W_{A3})$ as follows. Here, $W_{A1}$ is the mass of the component (A1), $W_{A2}$ is the mass of the component (A2), and $W_{A3}$ is the mass of the component (A3).

$$0.06 \leq W_{A3}/(W_{A1}+W_{A2}+WA3) \leq 0.25$$

When the content ratio of the component (A3) is less than 6 mass % of the whole component (A), a cured product having high strength cannot be obtained. In addition, the tackiness of the cured product becomes high. Besides, when the content ratio of the component (A3) is more than 25 mass %, the hardness of the cured product becomes unfavorably too high.

The content ratio of the component (A3) to the whole component (A) is more preferably 10 mass % or more and 20 mass % or less and particularly preferably 10 mass % or more and 15 mass % or less.

<(B) Polyorganohydrogensiloxane>

The component (B) used in this embodiment is composed of the (B1) straight-chained polyorganohydrogensiloxane having 2 hydrogen atoms bonded to silicon atoms at both ends of a molecular chain in one molecule (hereinafter, referred to as straight-chained polyorganohydrogensiloxane), and the (B2) polyorganohydrogensiloxane having 3 or more hydrogen atoms bonded to silicon atoms in one molecule (hereinafter, referred to as crosslinkable polyorganohydrogensiloxane). The component (B) reacts with the above component (A) and acts as a crosslinking agent.

<(B1) Straight-Chained Polyorganohydrogensiloxane>

In the component (B1), the number of hydrogen atoms bonded to silicon atoms is two in one molecule, and the two hydrogen atoms are each bonded to each of the silicon atoms at both ends of the molecule.

The straight-chained polyorganohydrogensiloxane being the component (B1) has a hydrocarbon group bonded to the silicon atom other than the hydrogen atoms bonded to the silicon atoms. The hydrocarbon group of the component (B1) is an unsubstituted monovalent hydrocarbon group containing no aliphatic unsaturated bond, and its examples include alkyl groups having a number of carbon atoms of 1 to 6 such as a methyl group, an ethyl group, a propyl group, a butyl group, a pentyl group, and a hexyl group. The methyl group is preferred because of the ease of synthesis.

A concrete preferable example of the component (B1) is both ends dimethylhydrogensilyl group-terminated polydimethylsiloxane.

The viscosity of the component (B1) is 0.1 to 200 mPa·s. When the viscosity falls within this range, the cured product to be obtained has low hardness and excellent mechanical properties. The viscosity of the component (B1) is more preferably in a range of 1 to 50 mPa·s. One kind of the component (B1) may be used independently, or two or more kinds of the component (B1) may be used in combination.

<(B2) Crosslinkable Polyorganohydrogensiloxane>

The component (B2) is polyorganohydrogensiloxane having 3 or more hydrogen atoms bonded to silicon atoms (Si—H) on average in one molecule. The molecular structure of the component (B2) is not particularly limited and, for example, various kinds of polyorganohydrogensiloxane such as straight-chained, cyclic, branched, three-dimensional network shaped (resinous) can be used. The resinous polyorganohydrogensiloxane having a tetrafunctional siloxane unit (Q unit) represented by a formula: $SiO_{4/2}$ is preferable. Further, the resinous polyorganohydrogensiloxane preferably has a monofunctional siloxane unit together with the Q unit. Si—H of the component (B2) and the component (B1) reacts with the alkenyl group of the component (A) and thereby acts as a crosslinking agent.

The method of obtaining the resinous polyorganohydrogensiloxane being the component (B2) is not particularly limited and, for example, chlorosilane having a hydrogen atom and tetraalkoxysilane and/or polysilicate (for example, ethyl polysilicate) are subjected to cohydrolysis and condensation in an organic solvent such as toluene, xylene or the like. A method of charging 1,1,3,3-tetramethyldisiloxane together with a hydrochloric acid instead of using chlorosilane as a starting material, and decomposing disiloxane under the acidic condition, can also be employed.

Examples of the resinous polyorganohydrogensiloxane being the component (B2) include: a copolymer having siloxane units composed of an $R^5_3SiO_{1/2}$ unit, an $R^5_2HSiO_{1/2}$ unit, and a Q unit; a copolymer having siloxane units composed of an $R^5_3SiO_{1/2}$ unit, an $R^5_2HSiO_{1/2}$ unit, an $R^5_2SiO_{2/2}$ unit, and a Q unit; a copolymer having siloxane units composed of an $R^5_3SiO_{1/2}$ unit, an $R^5_2HSiO_{1/2}$ unit, an $R^5_2SiO_{2/2}$ unit, an $R^5_2HSO_{2/2}$ unit, and a Q unit; and a copolymer having siloxane units composed of an $R^5_2HSiO_{1/2}$ unit and a Q unit.

In the above units, $R^5$s each independently represent an unsubstituted alkyl group. Examples of the unsubstituted alkyl group include alkyl groups having a number of carbon atoms of 1 to 6 such as a methyl group, an ethyl group, a propyl group, a butyl group, a pentyl group, and a hexyl group. The methyl group is preferred because of the ease of synthesis.

More specifically, the (B2) resinous polyorganohydrogensiloxane is preferably a copolymer having the siloxane units composed of a monofunctional siloxane unit represented by a formula: $(CH_3)_2HSiO_{1/2}$ (hereinafter, expressed by an $M^H$ unit), a monofunctional siloxane unit represented by a formula: $(CH_3)_3SiO_{1/2}$ (M unit), and the Q unit, or a copolymer having the siloxane units composed of the $M^H$ unit and the Q unit, and is particularly preferably the copolymer composed of the $M^H$ unit and the Q unit.

In the copolymer composed of the $M^H$ unit and the Q unit, a ratio of the units is preferably 1.5 to 2.2 mol and more preferably 1.8 to 2.1 mol of the $M^H$ unit to 1 mol of the Q unit. More specifically, the component (B2) particularly preferably has a structure in which 4 to 5 Q units form a cyclic siloxane skeletal structure and two $M^H$ units are bonded to each Q unit as represented by a unit formula: $[(CH_3)_2HSiO_{1/2}]_8[SiO_{4/2}]_4$ or a unit formula: $[(CH_3)_2HSiO_{1/2}]_{10}[SiO_{4/2}]_5$.

The viscosity of the (B2) resinous polyorganohydrogensiloxane is preferably 0.1 to 200 mPa·s. When the viscosity falls within this range, the compounding is easy and the cured product to be obtained has excellent mechanical properties. The viscosity of the component (B2) is more preferably 1 to 100 mPa·s.

The compounding amount of the component (B2) and the above component (B1) is an amount that the molar ratio of the hydrogen atoms in the component (B1) to a total of the hydrogen atoms and hydrogen atoms in the component (B2) is more than 0.2 and 0.75 or less and the molar ratio of a total of the hydrogen atoms in the component (B1) and the hydrogen atoms in the component (B2) to a total of the alkenyl groups in the above component (A) is 0.9 or more and 2.1 or less. Expressing the content ratio explained here by a mathematical expression, the compounding amounts can be expressed by $H_{B1}/(H_{B1}+H_{B2})$ and H/Vi, respectively, in which $H_{B1}$ is the number of moles of the hydrogen atoms in the component (B1), $H_{B2}$ is the number of moles of the hydrogen atoms in the component (B2), H is a total number of moles of the hydrogen atoms in the component (B1) and the hydrogen atoms in the component (B2), and Vi is the number of moles of the alkenyl groups in the component (A).

$$0.2 \le H_{B1}/(H_{B1}+H_{B2}) \le 0.75$$

$$0.9 \le H/Vi \le 2.1$$

When H/Vi is less than 0.9, the tackiness of the cured product surface unfavorably increases. Besides, when H/Vi is more than 2.1, a large amount of unreacted Si—H remains in the cured product, so that the properties of the cured product possibly change over time. A more preferable range of H/Vi is 1.0 or more and 1.8 or less.

Besides, if $H_{B1}/(H_{B1}+H_{B2})$ is 0.2 or less even when H/Vi is 0.9 or more and 2.1 or less, the cured product becomes too hard, failing to provide a cured product having low hardness. Further, if $H_{B1}/(H_{B1}+H_{B2})$ is more than 0.75, the degree of cross-linking decreases, failing to provide a cured product having high strength.

<(C) Hydrosilylation Reaction Catalyst>

The component (C) is a catalyst that promotes an addition reaction (hydrosilylation reaction) between the alkenyl groups in the above component (A) and the hydrogen atoms in the above component (B). Examples of the component (C) include a platinum-based catalyst, a palladium-based catalyst, a rhodium-based catalyst and the like, and the platinum-based catalyst (platinum or platinum compound) is preferable in terms of economy. As the platinum-based catalyst, a publicly-known one can be used, and there are a platinum-based catalyst which is activated by heat (hereinafter, referred to also as a thermal platinum-based catalyst), and a platinum-based catalyst which is activated by ultraviolet light (hereinafter, referred to also as a UV platinum-based catalyst). Concrete examples of the thermal platinum-based catalyst include platinum black; chloroplatinic acid; alcohol-modified chloroplatinic acid or the like; or complexes of chloroplatinic acid with olefin, aldehyde, vinyl group-containing siloxane, acetylene alcohols or the like.

Besides, the UV platinum-based catalyst is an ultraviolet-activating catalyst designed as a compound containing a platinum-based catalyst so that the catalytic activity is exhibited by irradiation of ultraviolet light. Suitable examples of the UV platinum-based catalyst include a photoactivatable catalyst containing a (η-diolefin)-(σ-aryl)-platinum complex, a η5cyclopentadienyl platinum complex compound, and a complex having an optionally substituted cyclopentadienyl ligand having a σ-bonded ligand (preferably a σ-bonded alkyl or allyl ligand). Another example of the photoactivatable platinum catalyst that can be used is one having a ligand selected from diketones.

A compounding amount of the component (C) may be an effective amount and can be appropriately increased/decreased according to a desired curing rate. Usually, the compounding amount is set such that the content ratio to the whole composition is 0.5 to 10 mass ppm in terms of platinum element, more preferably 1 to 5 mass ppm, and furthermore preferably 1 to 3 mass ppm. When the compounding amount of the platinum-based catalyst is less than 0.5 ppm, the hardness significantly decreases, whereas when the compounding amount of the platinum-based catalyst is more than 10 ppm, the transparency of the cured product decreases. When the compounding amount of the platinum-based catalyst falls within a range of 0.5 to 10 mass ppm, a cured product having excellent properties can be obtained and is also economically advantageous.

<Other Optional Components>

In the curable polyorganosiloxane composition of this embodiment, optional components besides the above component (A), component (B), and component (C) can be compounded within a range not impairing the object of this embodiment. Examples of the optional components include a reaction inhibitor, an adhesiveness imparting agent, a noncrosslinkable polyorganosiloxane containing no hydrogen atom or alkenyl group which is bonded to a silicon atom, a heat resistance imparting agent, a flame retardant, a thixotropic additive, a pigment, a die and so on.

The reaction inhibitor is a component for inhibiting the reaction of the composition, and examples thereof include acetylene-based, amine-based, carboxylic acid ester-based, phosphite ester-based reaction inhibitors, and concretely include 1-ethynyl-cyclohexanol, 3,5-dimethyl-1-hexyne-3-ol, triallyl isocyanurate, vinyl group-containing cyclic siloxane tetramer, methylbis(1,1-dimethyl-2-propynyloxy) silane, and the like.

In terms of securing sufficient mixing time to prevent variation in crosslink density of the cured product, it is preferable to compound the above reaction inhibitor.

It is also possible to store the polyorganosiloxane composition while dividing it in two liquids in order to prevent curing from proceeding, and mix the two liquids together in use for curing. For the two-liquid-mixing type, it is necessary to avoid storage of the polyorganohydrogensiloxane being the component (B) and the (C) hydrosilylation reaction catalyst in the same wrapper in terms of the risk of a dehydrogenation reaction.

The viscosity of the curable polyorganosiloxane composition of this embodiment is preferably in a range of 500 to 500,000 mPa·s as a value measured at 23° C. by a rotational viscometer from a viewpoint of formability and easy handling. A more preferable range is 1,000 to 150,000 mPa·s.

The curable polyorganosiloxane composition of this embodiment preferably contains no inorganic filler. Even if the curable polyorganosiloxane composition is made into a composition containing no inorganic filler, a cured product having excellent mechanical properties (tensile strength, elongation and the like) can be obtained. Further, by making the curable polyorganosiloxane composition into a composition containing no inorganic filler, a cured product having high transmittance of light (for example, visible light) can be obtained.

The curable polyorganosiloxane composition of this embodiment is cured by heating as needed. The curing condition is not particularly limited, and the composition is cured by being held normally at a temperature of 40 to 200° C. and preferably 60 to 170° C., and for about 0.5 minutes to 10 hours and more preferably for about 1 minute to 6 hours.

[Cured Product]

The cured product of this embodiment is made by curing the above polyorganosiloxane composition. This cured product has low hardness, high mechanical strength, and high transparency, and has no bleeding of a liquid substance and low surface tackiness.

The preferable cured product of this embodiment concretely has the following properties.

<Hardness>

The cured product of this embodiment has a hardness measured by Type E Durometer prescribed in JIS K6249 of 50 or less. A more preferable hardness is 20 to 45.

<Tensile Strength>

The cured product of this embodiment has a tensile strength prescribed in JIS K6249 is 0.5 MPa or more. A more preferable tensile strength is 0.6 MPa or more.

<Transparency>

The cured product having a thickness of 2 mm as a sample of this embodiment has a transmittance of light having a wavelength of 400 nm from 90% or more. A more preferable transmittance is 92% or more.

<Surface Tackiness>

A release force (release rate of 500 mm/min) when releasing a polyethylene terephthalate (PET) film from a cured product (thickness of 2 mm) obtained by integrating the polyorganosiloxane composition with the film is less than 15 mN/mm. A more preferable release force is less than 10 mN/mm.

The polyorganosiloxane cured product of this embodiment has the aforementioned properties and therefore is used for applications such as an optical sensor, an optical contact sensor, a pressure sensor, an optical member, an artificial skin and so on and is particularly suitable as a constituent material of a grip portion of the optical tactile sensor for a robot hand.

More specifically, in the optical tactile sensor, for example, a semi-spherical grip portion (touch pad) for griping an object comes into contact with the object, thereby deforming a dot pattern in a lattice form provided on the surface of the grip portion. The optical tactile sensor is configured to capture the deformation by a CCD camera therein and analyze the image to obtain added tactile information. Therefore, a material constituting the grip portion is required to have high strength and high transparency, be not too hard, and have low surface tackiness so that the gripped object is easy to release.

The polyorganosiloxane cured product of this embodiment has the aforementioned properties, low hardness, high strength, high transparency, and low surface tackiness, so that when it is used to constitute the grip portion of the optical tactile sensor, the optical tactile sensor can obtain accurate tactile information to achieve stable gripping and releasing, without damaging the object.

Further, the polyorganosiloxane cured product of this embodiment can be preferably used also as a material for forming an image display device, more specifically, a filler between the display portion and a protective portion of the image display device. In the case of using the polyorganosiloxane cured product as the filler, an image display device can be obtained in which the filler is sandwiched to be not too hard but stable between the display portion and the protective portion.

EXAMPLES

Hereinafter, this embodiment will be concretely described using examples but the present invention is not limited to the examples. Parts indicate parts by mass, and a viscosity is a value at 23° C. unless otherwise stated.

The components used in the following examples and comparative examples are as follows.

(A1): Straight-chained polymethylvinylsiloxane having both ends independently terminated by a dimethylvinylsiloxane unit and having a middle composed of a dimethylsiloxane unit (both ends dimethylvinylsiloxy group-terminated polydimethylsiloxane) (a viscosity of 12,400 mPa·s, a vinyl group amount of 0.060 mmol/g)

(A2): Polymethylvinylsiloxane having 1 alkenyl group on average in one molecule (a mixture of about 50 mol % of one end vinyl group-containing polydimethylsiloxane, about 25 mol % of both ends vinyl group-containing polydimethylsiloxane, and about 25 mol % of polydimethylsiloxane containing no alkenyl group) (a viscosity of 750 mPa·s, a vinyl group amount of 0.050 mmol/g)

(A3): Resinous polysiloxane represented by a unit formula: $M_{5.25}M^{vi}_1Q_8$ (a vinyl group amount of 1.1 mmol/g)

(B1): Polydimethylsiloxane having both ends independently terminated by a dimethylhydrogensilyl group (a viscosity of 15 mPa·s, a SiH amount of 1.3 mmol/g)

(B2): Resinous dimethylhydrogensiloxane represented by a unit formula: $M^H_8Q_4$ (a viscosity of 70 mPa·s, a SiH amount of 10 mmol/g)

(C): Platinum complex solution having tetramethyltetravinylcyclotetrasiloxane as a ligand Reaction Inhibitor: Dimethylbis(1,1-Dimethyl-2-Propynyloxy)Silane Note that the above (A2), (A3), and (B2) are obtained by the following methods, respectively.

<Preparation of (A2)>

0.04 parts of tetramethylammonium silanolate was added to a mixed solution of 100 parts of octamethylcyclotetrasiloxane, 0.43 parts of 1,1,3,3-tetramethyldivinyldisiloxane, and 2.30 parts of straight-chained polydimethylsiloxane (a viscosity of 5.1 mPa·s), and the resultant was stirred at 90 to 100° C. for 3 hours. Then, a by-product low-boiling compound was distilled at 100° C./3 mmHg to obtain polydimethylsiloxane having 1 vinyl group on average in one molecule (A2).

<Preparation of (A3)>

100 parts of chlorodimethylvinylsilane, 480 parts of chlorotrimethylsilane, 680 parts of tetraethoxysilane, and 600 parts of xylene were put into and stirred in a flask, and 860 parts of water was dropped thereinto. The resultant was stirred at 70 to 80° C. for 1 hour and thereby subjected to hydrolysis and then liquid separation, resulting in a xylene solution. Then, 300 parts of xylene and 0.26 parts of potassium hydroxide were added thereto and the resultant was subjected to heat refluxing for 2 hours. After cooling, a phosphoric acid was added for neutralization, and the resultant was adjusted so that nonvolatile content was 60 mass %, resulting in the (A3) resinous polysiloxane.

Note that when preparing the compositions in the examples, the above solution was mixed with the (A1) (mass ratio of mixture of (A1):(A3)=5:5 in terms of nonvolatile content), and heating to 150° C. under a reduced pressure condition was performed to remove xylene, thereby preparing a mixture of (A1) and (A3).

<Preparation of (B2)>

A mixed solution of 100 parts of tetraethoxysilane, 92 parts of dimethylchlorosilane, and 60 parts of toluene was dropped, while being stirred, into a reaction vessel in which an excessive amount of water was put, and subjected to cohydrolysis and condensation at room temperature. The resultant organic phase was washed with water until the washed water exhibited neutrality, and dehydrated, and then toluene and a by-product low-boiling compound were distilled at 100° C./5 mmHg to obtain (B2) resinous dimethylhydrogensiloxane.

Examples 1 to 8, Comparative Examples 1 to 7

The components listed in Table 1 and Table 2 were compounded and kneaded so as to indicate the percentages listed in the tables to prepare polyorganosiloxane compositions.

In the compositions in Examples 1 to 8 and Comparative Examples 1 to 7, values of $W_{A2}/(W_{A1}+W_{A2})$, $W_{A3}/(W_{A1}+W_{A2}+W_{A3})$, H/Vi, and $H_{B1}/(H_{B1}+H_{B2})$ were calculated. These values are listed in Table 1 and Table 2.

Next, for the polyorganosiloxane compositions obtained in Examples 1 to 8 and Comparative Examples 1 to 7, physical properties of the cured products (hardness, tensile strength, elongation, tearing strength, light transmitting property, surface tackiness and the presence or absence of oil bleeding) were measured and evaluated as follows. The results are listed in lower columns in Table 1 and Table 2. Note that in the evaluation of oil bleeding in the tables, the composition in which oil bleeding was not observed is indicated as O and the composition in which oil bleeding was observed is indicated as X.

<Hardness, Tensile Strength, Elongation, Tearing Strength>

The polyorganosiloxane compositions obtained in Examples 1 to 8 and Comparative Examples 1 to 7 were hardened by heating in a mold at 100° C. for 10 minutes to form into sheet-shaped cured products having a thickness of 2 mm. Test pieces according to JIS K 6249 were cut out from the sheets and subjected to measurement of hardness at 23° C. by Type A Durometer and Type E Durometer.

Further, the tensile strength, elongation, tearing strength (crescent) of the test pieces were measured by respective methods prescribed in JIS K 6249.

<Light Transmitting Property>

The polyorganosiloxane compositions obtained in Examples 1 to 8 and Comparative Examples 1 to 7 were hardened by heating in a mold at 100° C. for 10 minutes to form into sheet-shaped cured products having a thickness of 2 mm. Then, test pieces (30 mm long×30 mm wide) cut out from the obtained sheets were irradiated with light having a wavelength of 400 nm, and transmittance was measured. The measurement was carried out using a spectrophotometric colorimeter (KONICA MINOLTA Inc., apparatus name; CM-3500d).

<Surface Tackiness>

The polyorganosiloxane compositions obtained in Examples 1 to 8 and Comparative Examples 1 to 7 were hardened by heating in a mold at 100° C. for 10 minutes to form into sheet-shaped cured products having a thickness of 2 mm. In this event, by bonding a PET film (thickness of 50 m) on an inner surface of the mold, test pieces each having two PET films bonded on both surfaces of the cured products were obtained. Then, in each of the obtained test pieces, the release force required for releasing the film from the cured product was measured. The measurement of the release force was carried out by a method of vertically pulling up the film at a speed of 500 mm per minute to release it from the cured product by using an autograph.

It can be said that a smaller release force indicates lower surface tackiness of the cured product. In the case of using the cured product as a material constituting the grip portion of the optical tactile sensor, the release force measured by the above method is preferably less than 15 mN/mm.

<Presence or Absence of Oil Bleeding>

The polyorganosiloxane compositions obtained in Examples 1 to 8 and Comparative Examples 1 to 7 were hardened by heating in a mold at 100° C. for 10 minutes to form into sheet-shaped cured products having a thickness of 2 mm. The obtained sheet-shaped cured products were put on paper, and the presence or absence of oil bleeding from each of the cured products was determined depending on whether a stain was made on paper after a lapse of one day.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Composition (parts by mass) | (A1) Both ends dimethylvinylsiloxy group-terminated polydimethylsiloxane | 57.6 | 57.6 | 58.2 | 60.1 | 55.1 | 61.9 | 61.9 | 55.8 |
| | (A2) Mixture containing one end dimethylvinylsiloxy group-terminated polydimethylsiloxane | 24.7 | 24.7 | 25.0 | 15.0 | 13.8 | 6.9 | 6.9 | 18.6 |
| | (A3) Vinyl group-containing resinous polysiloxane | 9.2 | 9.2 | 9.3 | 13.3 | 17.2 | 17.2 | 17.2 | 13.2 |
| | (B1) Both ends dimethylhydrogensilyl group-terminated polydimethylsiloxane | 8.1 | 8.1 | 7.0 | 8.9 | 10.8 | 10.8 | 10.8 | 11.0 |
| | (B2) Resinous dimethylhydrogenpolysiloxane | 0.4 | 0.4 | 0.6 | 2.6 | 3.2 | 3.2 | 3.2 | 1.4 |
| | (C) Platinum complex solution having tetramethyltetravinylcyclotetrasiloxane as a lignad (Pt content: ppm) | 3 | 3 | 3 | 3 | 3 | 3 | 3 | 3 |
| | Dimethylbis(1,1-dimethyl-2-propynyloxy)silane | 0.001 | 0 | 0.001 | 0.001 | 0.001 | 0.001 | 0 | 0.001 |
| | $W_{A2}/(W_{A1} + W_{A2})$ | 0.30 | 0.30 | 0.30 | 0.20 | 0.20 | 0.10 | 0.10 | 0.25 |
| | $W_{A3}/(W_{A1} + W_{A2} + W_{A3})$ | 0.10 | 0.10 | 0.10 | 0.15 | 0.20 | 0.20 | 0.20 | 0.15 |
| | H/Vi ratio (whole) | 0.99 | 0.99 | 1.02 | 2.02 | 2.05 | 2.05 | 2.05 | 1.53 |
| | $HB_1 (HB_1 + HB_2)$ | 0.72 | 0.72 | 0.60 | 0.30 | 0.30 | 0.30 | 0.30 | 0.50 |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Properties of cured product | Hardness (Type A) | 4 | 4 | 6 | 19 | 27 | 27 | 25 | 7 |
| | Hardness (Type E) | 26 | 24 | 27 | 40 | 47 | 47 | 46 | 28 |
| | Tensile strength (MPa) | 0.93 | 0.78 | 1.33 | 2.88 | 3.78 | 2.72 | 3.41 | 0.8 |
| | Elongation (%) | 340 | 340 | 360 | 200 | 190 | 120 | 170 | 170 |
| | Tearing strength (Crescent) (N/mm) | 0.60 | 0.62 | 0.62 | 1.19 | 1.51 | 1.56 | 1.61 | 0.59 |
| | Transmittance (%) | 93 | 93 | 93 | 93 | 93 | 93 | 93 | 93 |
| | Release force (mN/mm) | 11.2 | 7.81 | 3.7 | 7.4 | 10.4 | 10.2 | 7.9 | 10.0 |
| | Oil bleeding property | ○ | ○ | ○ | ○ | ○ | ○ | ○ | ○ |

TABLE 2

|  |  | Comparative Ex. 1 | Comparative Ex. 2 | Comparative Ex. 3 | Comparative Ex. 4 | Comparative Ex. 5 | Comparative Ex. 6 | Comparative Ex. 7 |
|---|---|---|---|---|---|---|---|---|
| Composition (parts by mass) | (A1) Both ends dimethylvinylsiloxy group-terminated polydimethylsiloxane | 49.4 | 62.6 | 58.6 | 57.0 | 63.1 | 56.8 | 47.4 |
| | (A2) Mixture containing one end dimethylvinylsiloxy group-terminated polydimethylsiloxane | 33.0 | 26.8 | 25.1 | 24.5 | 27.0 | 14.2 | 11.9 |
| | (A3) Vinyl group-containing resinous polysiloxane | 9.2 | 4.7 | 9.3 | 9.1 | 4.7 | 17.8 | 23.1 |
| | (B1) Both ends dimethylhydrogensilyl group-terminated polydimethylsiloxane | 8.0 | 5.6 | 6.6 | 9.1 | 4.8 | 7.4 | 13.6 |
| | (B2) Resinous dimethylhydrogenpolysiloxane | 0.4 | 0.3 | 0.4 | 0.3 | 0.4 | 3.8 | 4.0 |
| | (C) Platinum complex solution having tetramethyltetravinylcyclotetrasiloxane as a lignad (Pt content: ppm) | 3 | 3 | 3 | 3 | 3 | 3 | 3 |
| | Dimethylbis(1,1-dimethyl-2-propynyloxy)silane | 0.001 | 0.001 | 0.001 | 0.001 | 0.001 | 0.001 | 0.001 |
| | $W_{A2}/(W_{A1} + W_{A2})$ | 0.40 | 0.30 | 0.30 | 0.30 | 0.30 | 0.20 | 0.20 |
| | $W_{A3}/(W_{A1} + W_{A2} + W_{A3})$ | 0.10 | 0.05 | 0.10 | 0.10 | 0.05 | 0.20 | 0.28 |
| | H/Vi ratio (whole) | 0.99 | 1.01 | 0.85 | 1.02 | 1.01 | 2.06 | 2.04 |
| | $HB_1 (HB_1 + HB_2)$ | 0.72 | 0.70 | 0.68 | 0.79 | 0.60 | 0.20 | 0.30 |
| Properties of cured product | Hardness (Type A) | 2 | 2 | 1 | 2 | 3 | 32 | 33 |
| | Hardness (Type E) | 19 | 21 | 19 | 21 | 24 | 51 | 51 |
| | Tensile strength (MPa) | 0.26 | 0.31 | 0.3 | 0.4 | 0.22 | 4.13 | 2.04 |
| | Elongation (%) | 230 | 450 | 380 | 350 | 300 | 150 | 82 |
| | Tearing strength (Crescent) (N/mm) | 0.49 | 0.58 | 0.66 | 0.56 | 0.56 | 1.82 | 1.4 |
| | Transmittance (%) | 93 | 92 | 93 | 93 | 93 | 93 | 93 |
| | Release force (mN/mm) | 8.2 | 21.0 | 20.3 | 17.0 | 9.5 | 8.1 | 7.2 |
| | Oil bleeding property | X | X | ○ | ○ | ○ | ○ | ○ |

The following is found from Table 1. Specifically, the cured products obtained from the polyorganosiloxane compositions in Examples 1 to 8 in which the components of (A1), (A2), (A3), (B1), (B2), and (C) are compounded at predetermined compositions prescribed in this embodiment each have a low hardness measured by Type E Durometer of 50 or less, high transparency such as high transmittance of light having a wavelength of 400 nm (thickness of 2 mm) of 90% or more, and a high mechanical strength such as a tensile strength of 0.5 MPa or more. The cured products each have no bleeding of a liquid substance, small release force (less than 15 mN/mm), and low surface tackiness.

In contrast to the above, the polyorganosiloxane composition in Comparative Example 1 has a content ratio of the (A1) both ends alkenyl group-containing polyorganosiloxane to a total of straight-chained alkenyl group polyorganosiloxane composed of the component (A1) and the component (A2) of less than 61 mass % and a content ratio ($W_{A2}/(W_{A1}+W_{A2})$) of the component (A2) of more than 39 mass %, and thus has not only lower tensile strength of the cured product but also oil bleeding.

Besides, the polyorganosiloxane compositions in Comparative Example 2 and Comparative Example 5 have $W_{A3}/(W_{A1}+W_{A2}+W_{A3})$ of less than 6 mass %, and thus have low tensile strength of the cured products. Besides, the polyorganosiloxane composition in Comparative Example 2 has large release force (15 mN/mm or more) and has high surface tackiness. Further, oil bleeding occurs in the cured product.

The polyorganosiloxane composition in Comparative Example 3 has a low H/Vi ratio of less than 0.9, and thus has not only low tensile strength of the cured product but also a large release force of 15 mN/mm or more and high surface tackiness of the cured product.

The polyorganosiloxane composition in Comparative Example 4 has $H_{B1}/(H_{B1}+H_{B2})$ of more than 0.75, and thus has not only low tensile strength of the cured product but also a large release force of 15 mN/mm or more and high surface tackiness of the cured product.

The polyorganosiloxane composition in Comparative Example 6 has $H_{B1}/(H_{B1}+H_{B2})$ of 0.2 or less, and thus has a high hardness of the cured product measured by Type E Durometer of more than 50, failing to provide a cured product having a sufficiently low hardness.

The polyorganosiloxane composition in Comparative Example 7 has $W_{A3}/(W_{A1}+W_{A2}+W_{A3})$ of more than 25 mass %, and thus has unfavorably high hardness (more than 50) of the cured product.

According to the curable polyorganosiloxane composition of this embodiment, a cured product having low hardness, high transparency, high mechanical strength such as a tensile strength can be obtained. Further, the cured product has no bleeding of a liquid substance and has low surface tackiness.

Consequently, the cured product obtained from the polyorganosiloxane composition can be used as a constituent material for an optical sensor, an optical contact sensor, a pressure sensor, an optical member, an artificial skin, an image display device, and so on and is particularly suitable as a material constituting a grip portion of the optical tactile sensor for a robot hand.

What is claimed is:

1. A curable polyorganosiloxane composition comprising:
   (A) an alkenyl group-containing polyorganosiloxane containing straight-chained polyorganosiloxane composed of (A1) a straight-chained polyorganosiloxane having a viscosity at 23° C. measured according to JIS K6249 of 1,000 to 1,000,000 mPas and having an alkenyl group bonded to each of silicon atoms at both ends of a molecular chain and (A2) a straight-chained polyorganosiloxane having a viscosity at 23° C. measured according to JIS K6249 of 10 to 50,000 mPas and having 0.6 or more and less than 2 alkenyl groups bonded to silicon atoms on average in one molecule, and (A3) a polyorganosiloxane having a tetrafunctional siloxane unit represented by a formula: $SiO_{4/2}$ and having a resin structure having 2 or more alkenyl groups bonded to silicon atoms on average in one molecule;
   (B) polyorganohydrogensiloxane composed of (B1) a straight-chained polyorganosiloxane having a viscosity at 23° C. measured according to JIS K6249 of 0.1 to 200 mPas and having 2 hydrogen atoms bonded to silicon atoms at both ends of a molecular chain in one molecule, and (B2) a polyorganosiloxane having 3 or more hydrogen atoms bonded to silicon atoms in one molecule, in an amount that a molar ratio of the hydrogen atoms in the component (B1) to a total of the hydrogen atoms and hydrogen atoms in the component (B2) is more than 0.2 and 0.75 or less and a molar ratio of a total of the hydrogen atoms in the component (B1) and the hydrogen atoms in the component (B2) to a total of the alkenyl groups in the component (A) is 0.9 or more and 2.1 or less; and
   (C) an effective amount of a hydrosilylation reaction catalyst, wherein components (A1) and (A2) are added in an amount of 61 to 95 mass % and 5 to 39 mass %, respectively, based on the total weight of (A1) and (A2), and component (A3) is provided in an amount of 6 mass % or more and 25 mass % or less based on the total weight of components (A1), (A2), and (A3).

2. The curable polyorganosiloxane composition according to claim 1, wherein
   the component (B2) is polyorganosiloxane having a tetrafunctional siloxane unit represented by a formula: $Si_{4/2}$ and having a resin structure having 3 or more hydrogen atoms bonded to silicon atoms in one molecule.

3. The curable polyorganosiloxane composition according to claim 1, wherein
   a hardness measured by Type E Durometer prescribed in JIS K6249 of a cured product of the curable polyorganosiloxane composition is 50 or less.

4. The curable polyorganosiloxane composition according to claim 1, wherein
   a tensile strength prescribed in JIS K6249 of a cured product of the curable polyorganosiloxane composition is 0.5 MPa or more.

5. The curable polyorganosiloxane composition according to claim 1, wherein
   a transmittance of light having a wavelength of 400 nm of a cured product having a thickness of 2 mm of the curable polyorganosiloxane composition is 90% or more.

6. The curable polyorganosiloxane composition according to claim 1, wherein
   a release force when releasing a polyethylene terephthalate film from a cured product having a thickness of 2 mm of the curable polyorganosiloxane composition integrally molded with the film at a rate of 500 mm/min is less than 15 mN/mm.

7. A polyorganosiloxane cured product being a cured product made by curing the curable polyorganosiloxane composition according to claim 1, used for at least one selected from an optical sensor, an optical tactile sensor, a pressure sensor, an optical member, an artificial skin, and an image display device.

* * * * *